INVENTOR.
SIDNEY L. WHITAKER
BY William R Jacox

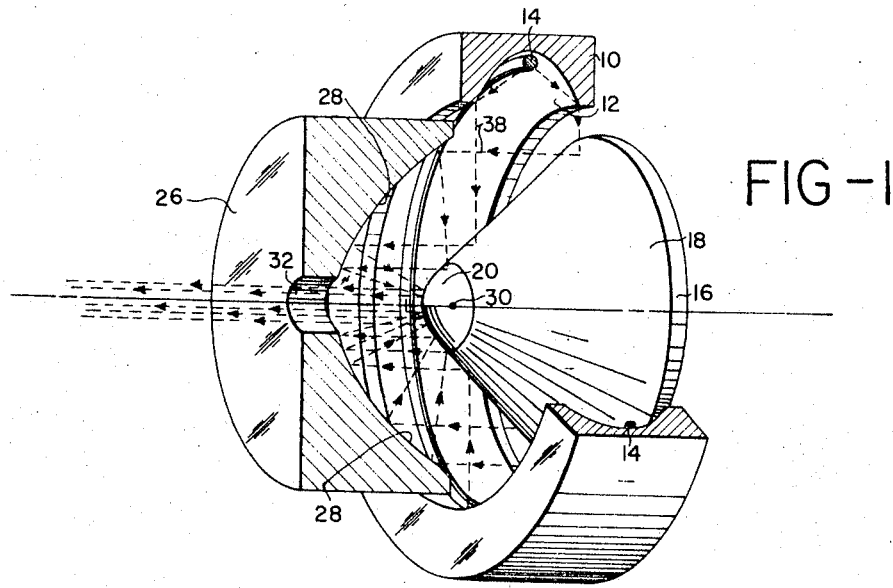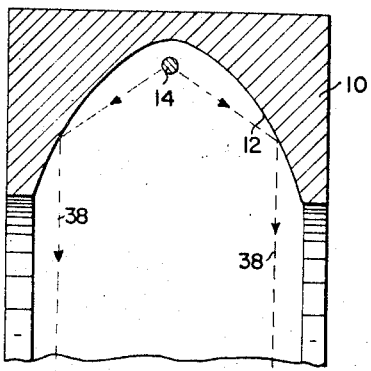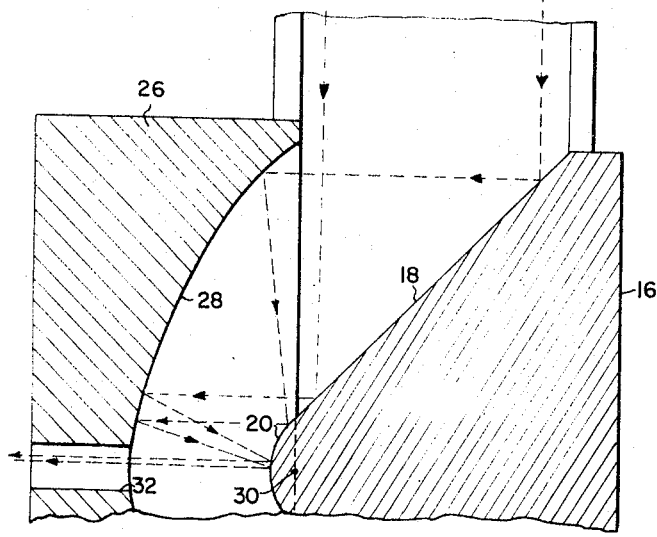

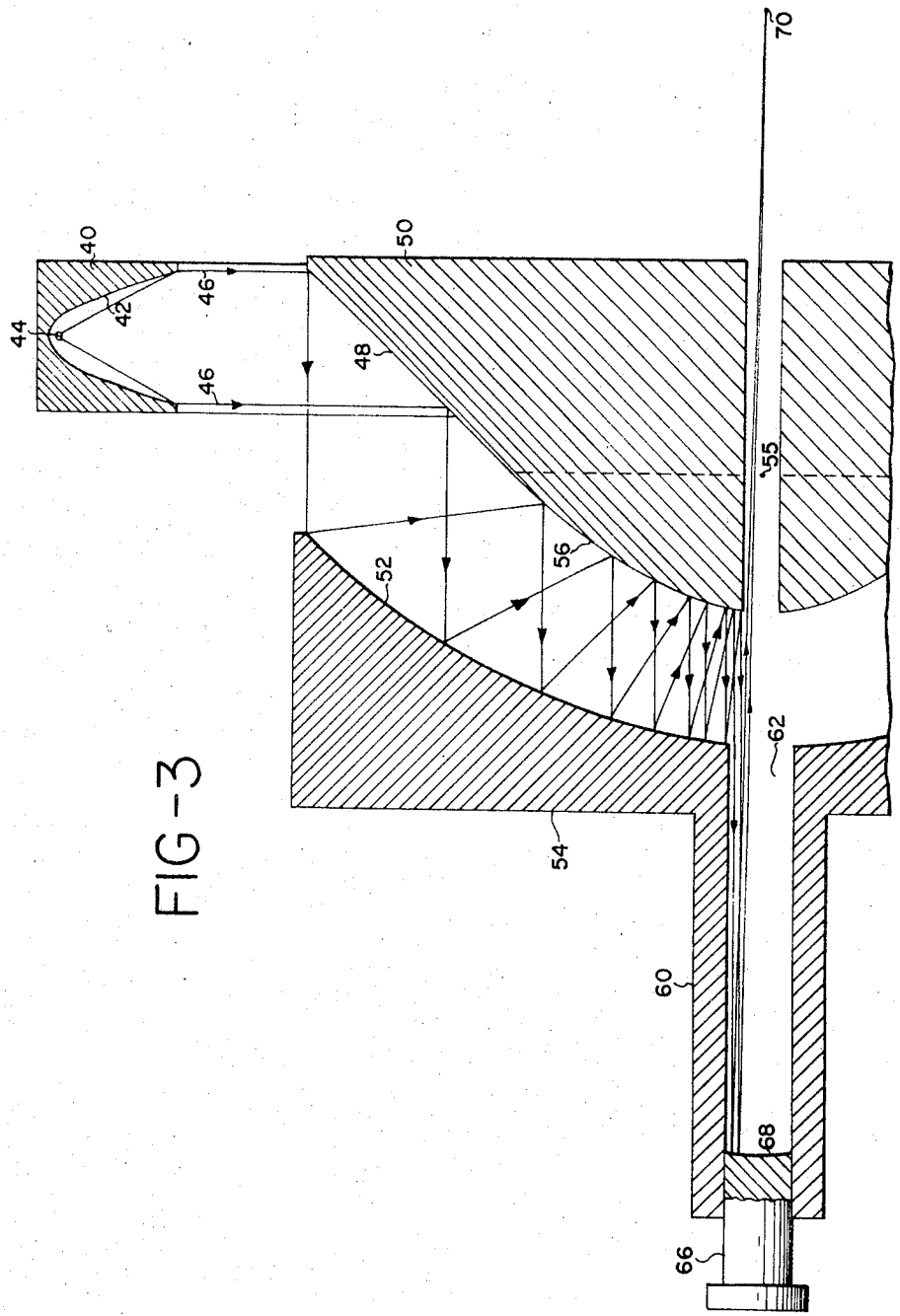

United States Patent Office 3,453,425
Patented July 1, 1969

3,453,425
STRUCTURE FOR CONCENTRATING
RADIANT ENERGY
Sidney L. Whitaker, R.R. 1, Box 134–D,
Dayton, Ohio 45315
Filed Oct. 21, 1965, Ser. No. 499,596
Int. Cl. F21m 7/00
U.S. Cl. 240—41.1                             11 Claims

ABSTRACT OF THE DISCLOSURE

A structure for concentrating radiant energy consisting of a reflector body having a toroidal parabolic surface and a source of radiant energy located at the focus thereof. An intermediate reflector spaced from the toroidal parabolic surface has a frustrum conical surface and a convex parabolic surface at the vertex. A secondary concave parabolic reflector, having an opening therethrough, is spaced from the intermediate reflector and the focus of the convex and concave surfaces is the same. Rays of radiant energy are reflected from the toroidal parabolic surface to the conical surface and then to the concave surface. The rays are then reflected to the convex parabolic surface and thence through the opening in the concave parabolic surface.

BACKGROUND OF THE INVENTION

This invention relates to structure for concentrating radiant energy.

Many types of devices and apparatus have been created for concentrating radiant energy. However, various problems have been involved in regard to obtaining good efficiency of operation and/or in regard to cost of construction.

It is an object of this invention to provide structure for concentrating radiant energy which structure has high efficiency and which has relatively low cost of construction.

Another object of this invention is to provide structure for concentrating any one of various types of radiant energy.

Another object of this invention is to provide structure which is capable of concentrating radiant energy into substantially parallel rays of energy.

Other objects and advantages reside in the construction of the invention, combinations thereof, the method of manufacture, and the mode of operation, as will become more apparent from the following description.

In the drawings:

FIGURE 1 is a perspective view with parts shown in section of structure of this invention for concentrating radiant energy.

FIGURE 2 is an enlarged fragmentary side sectional view of a portion of the structure of FIGURE 1.

FIGURE 3 is a sectional view showing other structure of this invention for concentrating radiant energy.

Figure 4:
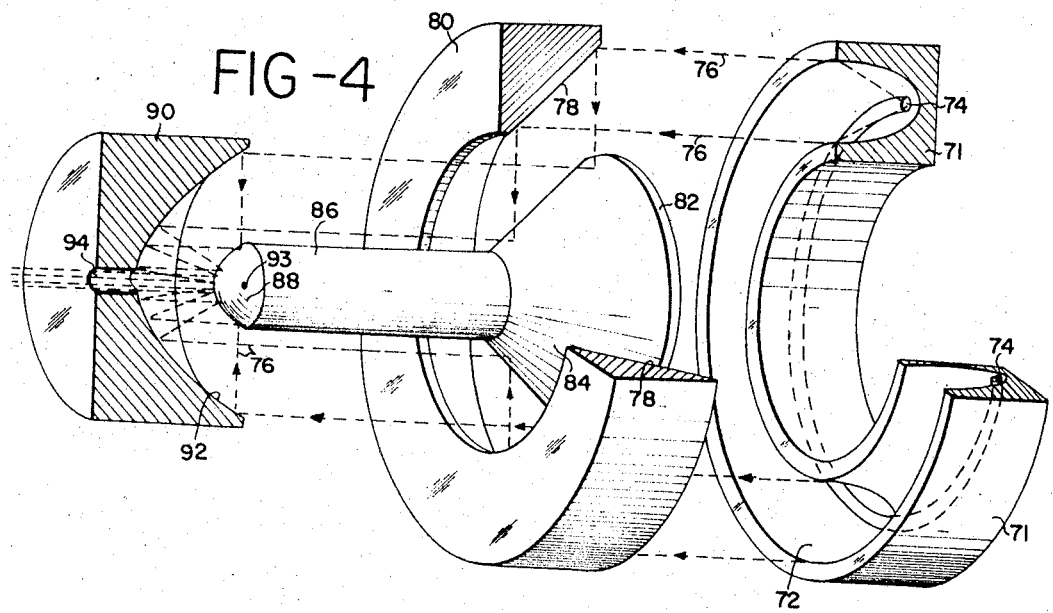
FIGURE 4 is a perspective view, with parts shown in section, of other structure of this invention for concentrating radiant energy.

Referring to the drawings in detail, structure of this invention as shown in FIGURES 1 and 2 comprises an annular primary reflector body 10 provided with a toroidal parabolic surface 12. A radiant energy source in the form of an annular light source 14 is positioned at the focus of the toroidal parabolic surface 12.

Positioned within the annular primary reflector body 10 is an intermediate reflector body 16 which has a conical surface 18. The axis of generation of the conical surface 18 is coaxial with the axis of generation of the toroidal parabolic surface 12. The reflector body 16 has a convex parabolic vertex or nose surface 20. The axis of generation of the convex parabolic surface 20 is coaxial with the axis of generation of the conical surface 18.

In alignment with the intermediate reflector body 16 and spaced therefrom is a secondary reflector body 26. The secondary reflector body 26 has a concave parabolic surface 28 which is generated about an axis which is coaxial with the axis of generation of the convex parabolic surface 20. The concave parabolic surface 28 has a focus 30 which is also the focus of the convex parabolic surface 20.

The secondary reflector body 26 has an opening 32 therethrough at the axis portion thereof.

It is to be understood that the annular light source 14 has a multiplicity of light rays emanating therefrom. Due to the fact that the light source 14 is located at the focus of the toroidal surface 12, each light ray which emanates from the light source 14 and which strikes the parabolic surface 12 is reflected therefrom in a direction normal to the axis of generation of the toroidal parabolic surface 12. Thus, each light ray which strikes the parabolic surface 12 is reflected therefrom in the manner illustrated in FIGURES 1 and 2.

FIGURES 1 and 2 illustrate the paths of movement of two light rays 38 which emanate from the light source 14. Each of these rays 38 engages the parabolic surface 12 and is then reflected to the conical surface 18. The rays 38 strike the conical surface 18. The conical surface 18 is at an angle of 45 degrees with respect to the axis of the intermediate reflector body 16. Therefore, due to the fact that the angle of incidence and the angle of reflection are equal with regard to the conical surface 18, the rays 38 are reflected from the conical surface 18 in a direction parallel to the axis of the intermediate reflector body 16.

The rays 38 then engage the concave parabolic surface 28 and are reflected toward the focus 30 of the concave parabolic surface 28. Then each of the rays 38 engages the convex parabolic surface 20 and is reflected therefrom back to the concave parabolic surface 28 along a line parallel to the axis of the intermediate reflector body 16.

Each of the rays 38 is reflected between the convex parabolic surface 20 and the concave parabolic surface 28 and approaches the axis of generation thereof, as illustrated in FIGURE 2. However, each of the rays 38 reaches a position in which it is reflected from the convex parabolic surface 20 into the opening 32 of the secondary reflector body 26. Each ray 38 then passes through the opening 32 in a line parallel to the axis of generation of the concave parabolic surface 28. Thus, each ray 38 is parallel to every other ray 38 as it passes through the opening 32 of the secondary reflector body 26.

Thus, it is understood that a multiplicity of rays 38 which emanate at various angles from the light source 14 are directed from the conical surface 18 to the concave parabolic surface 28 and to the convex parabolic surface 20 and then through the opening 32 of the secondary reflector body 26. Thus, the various rays of light energy from the light source 14 are concentrated into parallel light rays which are discharged through the opening 32 of the secondary reflector body 26. The parallel light rays thus discharged from the opening 32 can, of course, be employed for any suitable purpose.

FIGURE 3

FIGURE 3 illustrates other structure of this invention for concentrating radiant energy. An annular primary reflector body 40 has a toroidal concave parabolic surface 42. An annular light source 44 is positioned at the focus of the toroidal concave parabolic surface 42. The paths of travel of two light rays 46 from the light source 44 are illustrated.

Each light ray engages a conical surface 48 of an intermediate reflector body 50. The axis of generation of the toroidal concave parabolic surface is coaxial with the axis of generation of the conical surface 48. Each light ray 46 is then reflected to a concave parabolic surface 52 of a secondary reflector body 54. The concave parabolic surface 52 has the same axis of generation as the conical surface 48.

Each light ray 46 is reflected from the concave parabolic surface 52 toward a focus 55 of the concave parabolic surface 52 and then travels to a convex parabolic surface 56. The focus 55 of the concave parabolic surface 52 is the same as the focus of the convex parabolic surface 56. Also, the concave parabolic surface 52 is generated about an axis which is coaxial with the axis of generation of the convex parabolic surface 56.

Therefore, each light ray 46 is reflected from the convex parabolic surface 56 along a line parallel with the axis of generation thereof. Each ray 46 is reflected between the concave parabolic surface 52 and the convex parabolic surface 56 as the ray 46 moves closer to the axis of the secondary reflector body 54 and the intermediate reflector body 50.

However, the secondary reflector body 54 has a central portion 60 provided with a passage 62. As each light ray 46 approaches the axis of the secondary reflector body 54, the light ray 46 passes into the passage 62 of the central portion 60. A plug 66 is disposed within the passage 62 adjacent the end thereof. The plug 66 has a parabolic end surface 68 which has a focus 70. The light rays 46 enter the passage 62 and engage the parabolic surface 68 of the plug 66. Then each of the light rays 46 is reflected toward the focus 70. Thus, the various light rays 46 which emanate from the light source 44 are concentrated at the focus 70 of the parabolic surface 68 of the plug 66.

The plug 66 is shown as being slidably axially movable within the passage 62. As the plug 66 is axially moved, the focus 70 thereof is moved. Thus, the radiant energy from the light source 44 can be concentrated at any desired point within the range of movement of the plug 66.

FIGURE 4

FIGURE 4 illustrates other structure of this invention. A primary reflector body 71 is provided with an annular parabolic surface 72. An annular light source 74 is disposed at the focus of the parabolic surface 72.

The paths of travel of two light rays 76 of the light source 74 are illustrated in FIGURE 4. Each light ray 76 is reflected from the parabolic surface 72 along a line parallel with the axis of the body 71. The light rays 76 engage an annular inclined surface 78 of an annular intermediate reflector body 80. The inclined surface 78 is at an angle of 45 degrees with respect to the axis of the annular intermediate body 80. Within the annular intermediate reflector body 80 is a secondary reflector body 82 provided with a conical surface 84. The axis of generation of the inclined surface 78 is coaxial with the axis of generation of the conical surface 84. The conical surface 84 of the secondary reflector body 82 is at an angle The secondary reflector body 82 has an extension portion 86 provided with a convex parabolic surface 88 at the end thereof. The extension portion 86 may be of any suitable length and serves as a support member. However, a body having the parabolic surface 88 coaxial with the conical surface 84 may be supported in any other suitable manner in spaced relationship from the conical surface 84.

A fourth reflector body 90 is positioned adjacent the end of the extension portion 86 of the secondary reflector body 82. The fourth reflector body 90 has a concave parabolic surface 92 which has a focus 93 which is the same as the focus of the convex parabolic surface 88. The axis of generation of the concave parabolic surface 92 is coaxial with the axis of generation of the convex parabolic surface 88. The fourth reflector body 90 also has an opening 94 therethrough at the central portion thereof.

Light rays 76 which are reflected from the inclined surface 78 are reflected therefrom along a line which is normal to the axis of the secondary reflector body 82. Thus, the light rays 76 engage the conical surface 84 of the body 82 and are reflected therefrom along lines parallel to the axis of the body 82.

Then, the rays 76 engage the concave parabolic surface 92 and are reflected therefrom toward the focus 93 thereof. Thus, the light rays 76 engage the convex parabolic surface 88 and are reflected therefrom along lines parallel with the axis of the fourth reflector body 90. As the rays 76 approach the axis of the bodies 82 and 90, the rays 76 are reflected through the opening 94 in the body 90. All of the rays 76 are parallel and are thus concentrated as they pass through the opening 94 of the fourth reflector body 90. Thus, various light rays 76, emanating from the light source 74, are concentrated as they pass through the opening 94 of the fourth reflector body 90.

FIGURE 5

Figure 5:
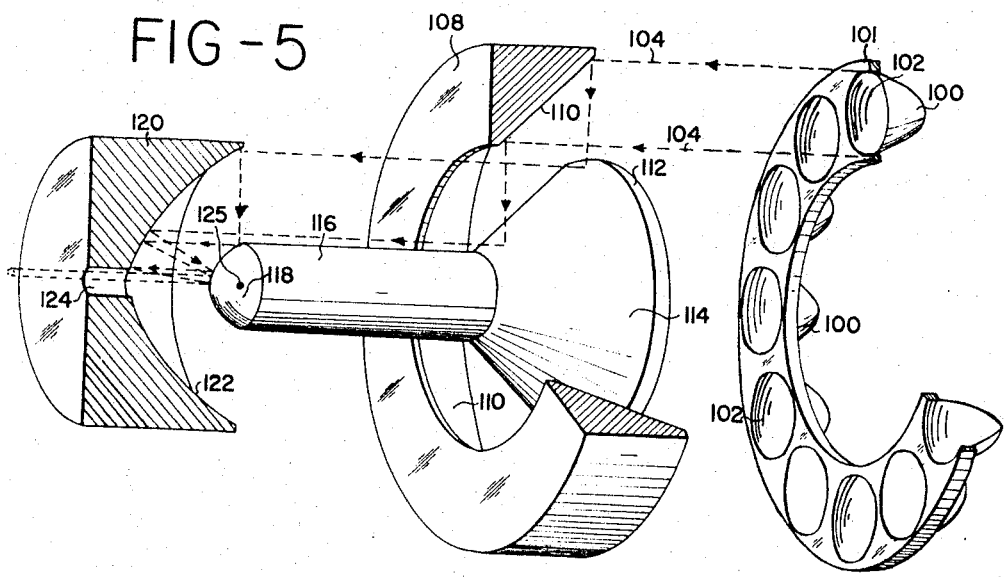
FIGURE 5 is a perspective view, with parts shown in section, of other structure of this invention for concentrating radiant energy.

FIGURE 5 illustrates other structure of this invention. A plurality of lamps 100 are arranged in annular relationship and are carried by support structure 101. Each of the lamps 100 has a concave parabolic reflector surface 102 therewithin. A light source, not shown, is disposed at the focus of the parabolic surface 102 within each lamp 100. Of course, each lamp 100 has a multiplicity of light rays emanating therefrom. The paths of travel of two of the light rays 104 are illustrated in FIGURE 5. The rays 104 are shown as being reflected from the parabolic surface 102 of one of the lamps 100. An intermediate reflector body 108 is similar to the body 80 of FIGURE 4 and has an inclined surface 110. A secondary reflector body 112 is disposed within the confines of the intermediate reflector body 108. The secondary reflector body 112 has a conical surface 114. The secondary reflector body 112 is similar to the secondary reflector body 82 of the structure of FIGURE 4 and has an extension 116 provided with an end portion having a convex parabolic surface 118.

Adjacent the end of the extension 116 is a fourth reflector body 120 having a concave parabolic surface 122. The fourth reflector body 120 has an opening 124 therethrough at the central portion thereof. The convex parabolic surface 118 and the concave parabolic surface 122 have the same focus, herein shown as focus 125.

The light rays 104 are reflected to the inclined surface 110, then to the conical surface 114, then to the concave parabolic surface 122, and then to the convex parabolic surface 118. Then the light rays 104 are reflected from the convex parabolic surface 118 through the opening 124 in the fourth reflector body 120 and outwardly therefrom. Thus, the numerous light rays 104 emanating from the lamps 100 are concentrated in parallel relationship and pass through the opening 124 in the fourth reflector body 120.

Although the preferred embodiment of the device has been described, it will be understood that within the purview of this invention various changes may be made in The invention having thus been described, the following is claimed:

1. Structure for concentrating radiant energy comprising:
   a primary reflector body having a toroidal parabolic surface,
   an annular source of radiant energy disposed at the focus of the toroidal parabolic surface,
   an intermediate reflector body having a frustum conical surface, the intermediate reflector body having a convex parabolic surface at the vertex portion thereof, the axis of generation of the convex parabolic surface being coaxial with the axis of generation of the conical surface,
   a secondary reflector body having a concave parabolic surface spaced from the convex parabolic surface of the intermediate reflector body, the focus of the convex parabolic surface being the same as the focus of the concave parabolic surface,
   the secondary reflector body having an opening therethrough at the axis thereof,
   rays of radiant energy from the source thereof being reflected from the parabolic surface of the primary reflector body to the conical surface, the rays then being reflected from the conical surface to the concave parabolic surface, the rays then being reflected from the concave parabolic surface to the convex parabolic surface, the rays being reflected from the convex parabolic surface through the opening in the secondary reflector body, the rays being parallel one with respect to the others as they travel through the opening.

2. Structure of the type described comprising:
   a plurality of lamps arranged in annular relationship, each of the lamps having a parabolic reflector surface,
   structure having an inclined surface spaced from the lamps, the inclined surface being engaged by light rays from the lamps,
   structure providing a second inclined surface spaced from the first said inclined surface, the second inclined surface being engaged by light rays reflected from the first said inclined surface,
   structure providing a concave parabolic surface spaced from the second inclined surface,
   structure providing a convex parabolic surface spaced from the concave parabolic surface,
   the focus of the convex parabolic surface being the focus of the concave parabolic surface,
   light rays being reflected from the second inclined surface to the concave parabolic surface and then to the convex parabolic surface,
   there being an opening in the concave parabolic surface through which light rays are reflected from the convex parabolic surface.

3. Apparatus for concentration of radiant energy comprising:
   annular structure providing a toroidal parabolic surface,
   an annular radiant energy source at the focus of the toroidal parabolic surface, so that rays from the radiant energy source are reflected from the parabolic surface toward the axis of the annular structure,
   structure within the annular structure and providing a truncated conical surface which is coaxial with the annular structure, the conical surface being at substantially 45 degrees with respect to the axis of the structure,
   the truncated conical surface having a convex parabolic surface at the vertex end thereof,
   structure providing a concave parabolic surface adjacent the convex parabolic surface with the focus of the concave parabolic surface being the focus of the convex parabolic surface,
   the axes of generation of all of the surfaces being coaxial,
   radiant energy being reflected from the toroidal parabolic surface to the conical surface and then to the concave parabolic surface and then to the convex parabolic surface, the concave parabolic surface having an opening therethrough so that radiant energy which is reflected from the convex parabolic surface passes therethrough.

4. Apparatus for concentration of radiant energy comprising:
   structure providing a toroidal concave parabolic surface,
   a source of radiant energy at the focus of the toroidal concave parabolic surface,
   the structure also providing a truncated conical surface adjacent the toroidal concave parabolic surface,
   the structure also providing a convex parabolic surface adjacent the truncated conical surface,
   the structure also providing a concave parabolic surface adjacent the convex parabolic surface with the focus of the convex parabolic surface being the focus of the concave parabolic surface,
   rays of radiant energy emanating from the source of radiant energy being reflected from the toroidal concave parabolic surface to the truncated conical surface, the rays of radiant energy being reflected from the truncated conical surface to the concave parabolic surface and then to the convex parabolic surface, the rays of radiant energy being reflected in parallel relationship from the convex parabolic surface.

5. Apparatus for concentration of radiant energy comprising:
   an annular body provided with a toroidal concave parabolic surface,
   a source of radiant energy positioned at the focus of the toroidal concave parabolic surface,
   an intermediate reflector body provided with a truncated conical surface spaced from the annular body and coaxial therewith, the truncated conical surface having an axis of generation which is coaxial with the intermediate reflector body, the intermediate reflector body also having a convex parabolic surface which is generated about an axis which is coaxial with the intermediate reflector body,
   a secondary reflector body having a concave parabolic surface spaced from the convex parabolic surface, the focus of the convex parabolic surface being the focus of the concave parabolic surface,
   the secondary reflector body having an opening therein, there being a concave parabolic receiver surface in alignment with the opening,
   rays of radiant energy from the source thereof being reflected by the toroidal concave parabolic surface to the conical surface and from the conical surface to the concave parabolic surface and from the concave parabolic surface to the convex parabolic surface, the rays being reflected from the convex parabolic surface through the opening to the concave parabolic receiver surface, the rays being reflected from the concave parabolic receiver surface toward the focus thereof.

6. Structure for concentrating radiant energy comprising:
   a primary reflector body having a concave parabolic surface,
   a source of radiant energy disposed at the focus of the concave parabolic surface,
   an intermediate reflector body provided with a truncated conical surface, the intermediate reflector body also having a convex parabolic surface, a secondary reflector body having a concave parabolic surface spaced from the convex parabolic surface, the focus of the concave parabolic surface being the focus of the convex parabolic surface, the secondary reflector body having an opening therein, the secondary reflector body having a receiver concave parabolic surface in alignment with the opening and spaced from the first said concave parabolic surface, the intermediate reflector body having an opening therethrough in alignment with the opening of the secondary body, rays of radiant energy from the source thereof being reflected from the concave parabolic surface of the primary body, the rays striking the conical surface and being reflected therefrom to the concave parabolic surface of the secondary body, the rays being reflected therefrom to the convex parabolic surface, the rays being reflected from the convex parabolic surface to the receiver concave parabolic surface which is in alignment with the opening in the first said concave parabolic surface of the secondary body, the rays being reflected from the receiver concave parabolic surface to the focus thereof as the rays pass from the receiver concave parabolic surface through the opening in the secondary body and through the opening in the intermediate body.

7. Apparatus for concentration of radiant energy comprising:

structure providing a toroidal concave parabolic surface, a source of radiant energy at the focus of the toroidal concave parabolic surface, the structure also providing a truncated conical surface spaced from the toroidal concave parabolic surface, the structure also providing a convex parabolic surface spaced from the truncated conical surface, the structure also providing a concave parabolic surface spaced from the convex parabolic surface with the focus of the convex parabolic surface being the focus of the concave parabolic surface, rays of radiant energy emanating from the source of radiant energy being reflected from the toroidal concave parabolic surface to the truncated conical surface, the rays of radiant energy being reflected from the truncated conical surface to the concave parabolic surface and then to the convex parabolic surface, there being an opening in the concave parabolic surface, the rays of radiant energy being reflected in parallel relationship from the convex parabolic surface, through the opening in the concave parabolic surface.

8. Apparatus for concentration of radiant energy comprising:

a primary reflector body provided with a side surface, there being a groove in the side surface of the body, the groove having a parabolic surface, a source of radiant energy disposed at the focus of the parabolic surface of the groove, rays emanating from the source of radiant energy thus being reflected by the parabolic surface of the groove in a lateral direction from the primary reflector body, structure providing an inclined surface spaced from the annular groove and in alignment therewith, structure providing a second inclined surface spaced from the first inclined surface, structure providing a concave parabolic surface spaced from the second inclined surface, structure providing a convex parabolic surface spaced from the concave parabolic surface, the focus of the concave parabolic surface being the focus of the convex parabolic surface, rays of radiant energy being reflected by the parabolic surface of the groove to the first said inclined surface, then to the second inclined surface, then to the concave parabolic surface, and then to the convex parabolic surface, the rays being reflected in concentrated parallel relationship from the convex parabolic surface.

9. Apparatus of the type described comprising:

structure providing a groove having a parabolic surface, the structure also providing an inclined surface spaced from the groove, the structure also providing a concave parabolic surface spaced from the inclined surface, the structure also providing a convex parabolic surface spaced from the concave parabolic surface, the axes of generation of all of the surfaces being coaxial, a source of radiant energy positioned at the focus of the parabolic surface of the groove, rays of radiant energy being reflected from the parabolic surface of the groove to the inclined surface, the rays being reflected in parallel relationship from the inclined surface to the concave parabolic surface, the rays being reflected from the concave parabolic surface to the convex parabolic surface, the rays being reflected in parallel relationship from the convex parabolic surface.

10. Apparatus for concentration of radiant energy comprising:

structure providing a toroidal concave parabolic surface, a source of radiant energy at the focus of the toroidal concave parabolic surface, the structure also providing a truncated conical surface spaced from the toroidal concave parabolic surface, the structure also providing a convex parabolic surface spaced from the truncated conical surface, the structure also providing a concave parabolic surface spaced from the convex parabolic surface with the focus of the convex parabolic surface being the focus of the concave parabolic surface, the axes of generation of the surfaces being coaxial, rays of radiant energy emanating from the source of radiant energy being reflected from the toroidal concave parabolic surface to the truncated conical surface, the rays of radiant energy being reflected from the truncated conical surface to the concave parabolic surface and then to the convex parabolic surface.

11. Apparatus for concentration of radiant energy comprising:

a plurality of sources of radiant energy arranged in annular relationship, each of the sources of radiant energy having a parabolic reflector surface, structure having an inclined surface spaced from the sources of radiant energy, the inclined surface being engaged by rays of radiant energy emitted from the sources of radiant energy, structure providing a second inclined surface spaced from the first said inclined surface, the second inclined surface being engaged by rays of radiant energy reflected from the first said inclined surface, structure providing a concave parabolic surface spaced from the second inclined surface, structure providing a convex parabolic surface spaced from the concave parabolic surface, the focus of the convex parabolic surface being the focus of the concave parabolic surface, rays of radiant energy being reflected from the second inclined surface to the concave parabolic surface and then to the convex parabolic surface, there being an opening in the concave parabolic surface through which rays of radiant energy are reflected from the convex parabolic surface.

References Cited

UNITED STATES PATENTS

| | | | |
|---|---|---|---|
| 1,588,816 | 6/1926 | Sisson | 240—46.45 |
| 1,981,328 | 10/1934 | Rivier | 240—41.1 |
| 2,001,378 | 5/1935 | Cornwall | 240—41.1 |
| 2,741,691 | 4/1956 | Lee | 350—294 XR |
| 3,242,806 | 3/1966 | Hine | 350—294 |

FOREIGN PATENTS 763,376  12/1956  Great Britain.

NORTON ANSHER, *Primary Examiner.*

R. P. GREINER, *Assistant Examiner.*

U.S. Cl. X.R.

240—41.35; 350—294